(12) United States Patent
Durga et al.

(10) Patent No.: US 7,551,731 B2
(45) Date of Patent: Jun. 23, 2009

(54) FLEXIBLE CALLER ID AND CALLING NAME INFORMATION PRESENTATION

(75) Inventors: Visweswararao Durga, Wheaton, IL (US); Christopher L. Fernandez, Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 960 days.

(21) Appl. No.: 10/930,285

(22) Filed: Aug. 31, 2004

(65) Prior Publication Data

US 2006/0045243 A1    Mar. 2, 2006

(51) Int. Cl.
*H04M 1/56* (2006.01)

(52) U.S. Cl. .............................. 379/142.09; 379/88.21; 455/415

(58) Field of Classification Search ............ 379/142.01, 379/142.03, 88.19, 88.21, 142.09; 455/415
See application file for complete search history.

(56) References Cited

U.S. PATENT DOCUMENTS

| | | | | |
|---|---|---|---|---|
| 5,033,076 A | * | 7/1991 | Jones et al. ................. | 379/88.2 |
| 5,590,184 A | * | 12/1996 | London .................. | 379/142.09 |
| 5,864,612 A | * | 1/1999 | Strauss et al. .......... | 379/142.03 |
| 5,901,209 A | * | 5/1999 | Tannenbaum et al. .. | 379/142.09 |
| 6,343,120 B1 | * | 1/2002 | Rhodes ................... | 379/142.01 |
| 6,662,006 B2 | * | 12/2003 | Glass ......................... | 455/415 |
| 7,099,445 B2 | * | 8/2006 | Creamer et al. ........ | 379/142.06 |

* cited by examiner

*Primary Examiner*—Gerald Gauthier

(57) ABSTRACT

Embodiments of the system, and method provide for network support for providing caller flexibility on "name", "number", and "message" for a calling terminal that is displayed on a called terminal. One embodiment of the method may have the steps of: entering a command to use at least one of an alternate caller name, an alternate caller number and an alternate caller message for a calling terminal, instead of a preassigned caller name and caller number for the calling terminal; looking up the at least one of an alternate caller name, an alternate caller number and an alternate caller message; and using the at least one of an alternate caller name, an alternate caller number and an alternate caller message in place of the preassigned caller name and caller number for the calling terminal.

23 Claims, 3 Drawing Sheets

FLEXIBLE CALLER ID AND CALLING NAME INFORMATION PRESENTATION

TECHNICAL FIELD

The present invention relates generally to telecommunication networks, and in particular to providing caller flexibility on "name", "number", and "message" for a calling terminal that is displayed on a called terminal.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has a number of important features. Nearly all wireless phones incorporate at least a keyboard for entering numbers and text, and a display that allows the user to display text, dialed numbers, pictures and incoming caller numbers. Additionally, wireless phones may incorporate electronic phonebooks, speed dialing, single button voicemail access, and messaging capabilities, such as e-mail.

The features described above present only a sample of features that are capable of, or have already been, implemented into wireless phone systems. Any individual feature is capable of implementation into some or all of the wireless systems using the modulation schemes mentioned above. A particularly useful feature provides caller identification.

An automatic number identification device is used in a telephone system to enable a telephone central office to identify from which of two parties on a two party telephone service a call is originating and is coupled to a pair of telephone lines extended from the telephone central office to one of the parties being served by the two party telephone service. In other words, an automatic number identification system allows a modem or a telephone to identify the caller ID signals without user intervention. Some telephones and modems are equipped with ANI capability to provide users the convenience of ANI system.

An ANI system is also useful for such state-of-the-art technology as "recall." When an attempted telephone call goes unanswered, the caller ID is identified by an automatic number identification system on the called telephone and stored in a memory device such as a random access memory (RAM). When a user on the called telephone side wishes to call the last number the user missed, the user can press a special "recall" button or a combination of buttons, such as the "*" key followed by the "9" key, on the user's telephone key panel to initiate an outgoing call to the last number that called. Upon detecting a special key sequence for "recall," the user's telephone makes a "recall" to the telephone number that last called.

In an ANI system, caller ID signals are sent to a called modem or a telephone when a call is made to the called telephone number. The caller ID signals provide the called telephone or modem with identification of the calling telephone. The called telephone uses the caller ID (ANI) signals to identify the calling telephone or modem. Typical caller ID signals include frequency shift keyed (FSK) modem tones transmitted between rings of the ringing signal. A similar system for providing the name of a caller is referred to as calling name presentation (CNAP).

It is a drawback of the prior art that current ANI and CNAP functionality provides limited control to an end user/operator on what is displayed at the called party device. In the prior art only the name and number of the caller or a restriction code e.g. private call may be displayed.

It is a further drawback of the prior art that the database cannot be programmed to, based on the time and day, provide a specific caller name and/or a specific caller number and/or a specific caller message. The prior art also cannot invoke a fixed set of settings based on a day and/or a time.

SUMMARY

The invention in one implementation encompasses a system. One embodiment of the system may have: a calling terminal and a called terminal operatively connected to a network; a database operatively connected to the network; at least one of an alternate caller name, an alternate caller number and an alternate caller message, for the calling terminal, stored in the database; and an input command, the input command effecting use of the at least one of an alternate caller name, an alternate caller number and an alternate caller message for the calling terminal, instead of a preassigned caller name and caller number for the calling terminal; wherein, when the input command is entered to use the at least one of an alternate caller name, an alternate caller number and an alternate caller message, the network displays, at the called terminal, the at least one of an alternate caller name, an alternate caller number and an alternate caller message for the calling terminal.

Another implementation of the present invention encompasses a method that may have the steps of: entering a command to use at least one of an alternate caller name, an alternate caller number and an alternate caller message for a calling terminal, instead of a preassigned caller name and caller number for the calling terminal; looking up the at least one of an alternate caller name, an alternate caller number and an alternate caller message; and using the at least one of an alternate caller name, an alternate caller number and an alternate caller message in place of the preassigned caller name and caller number for the calling terminal.

BRIEF DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

Embodiments of the present method and system are not only applicable to a distributed call-centric area, but also to both the consumer and the enterprise, wireline and wireless systems.

Although the present system and method may be used with any type of network (wired and wireless, for example), in one exemplary embodiment the subscriber may be a mobile subscriber who uses a mobile terminal (also referred to as mobile phone, a cell phone, mobile handset, or car phone). It is to be understood, however, that the present system and method may be used with non-mobile phones and terminals, as well as, mobile phones and mobile terminals. Those skilled in the art will be able to transfer the teachings of the present method and apparatus from the below-described mobile terminal embodiment to an embodiment for a non-mobile terminal.

Figure 1:
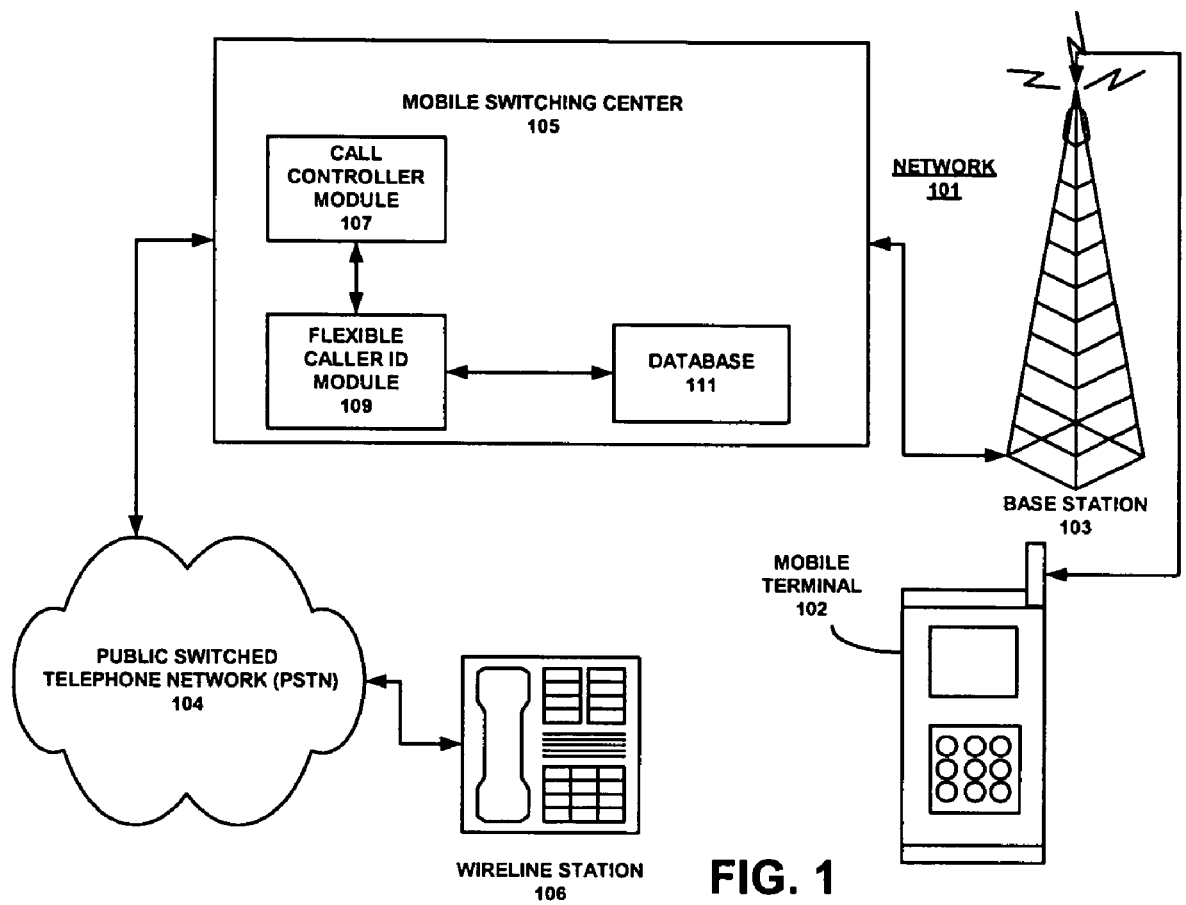
FIG. 1 depicts a block diagram that illustrates elements of a system according to one embodiment for providing caller flexibility on "name", "number" and "message" that may be displayed in place of normal ANI and CNAP.

In the FIG. 1 embodiment a network 101 is operatively connected to at least one mobile terminal 102. As is known the network 101 may have at least one base station 103, which is operatively connected to a mobile switching center 105, wirelessly coupled to the mobile terminal 102. The mobile switching center 105 in the network 101 may also have a call control module 107 operatively connected to base station 103 and to a flexible caller ID module 109. A database 111 may also be operatively connected to the flexible caller ID module 109.

The network 101 may be, or may be part of, one or more of a telephone network, a local area network ("LAN"), the Internet, and a wireless network. In the depicted embodiment, a public switched telephone network (PSTN) 104 is connected to the mobile switching center 105. The PSTN 104 routes calls to and from mobile users through the mobile switching center 105. The PSTN 104 also routes calls from and to wireline stations 106. The PSTN 104 generally may be implemented as the worldwide voice telephone network accessible to all those with telephones and access privileges (e.g., AT&T long distance network).

The flexible caller ID module 109 allows calling terminals to subscribe to an operator service that allows them to display at least one of an identified substitute name, substitute number and substitute message (that may be stored, for example, in the database 111) on the called terminal. The following is one example of an embodiment of the present system and method. A caller making a call from a home number (630-224-9999) on behalf of F&D Services (whose phone number is 987-234-5678). The caller may have the F&D Services number, 987-234-5678, displayed at the called party screen instead of the limited traditional choice. While an individual may have control over information that may be displayed on the other terminating end, the control may alternatively be managed by a third entity (for example, F&D services overriding what is displayed when a call is made from 630.224.9999 based on time of day or some other context).

Figure 2:
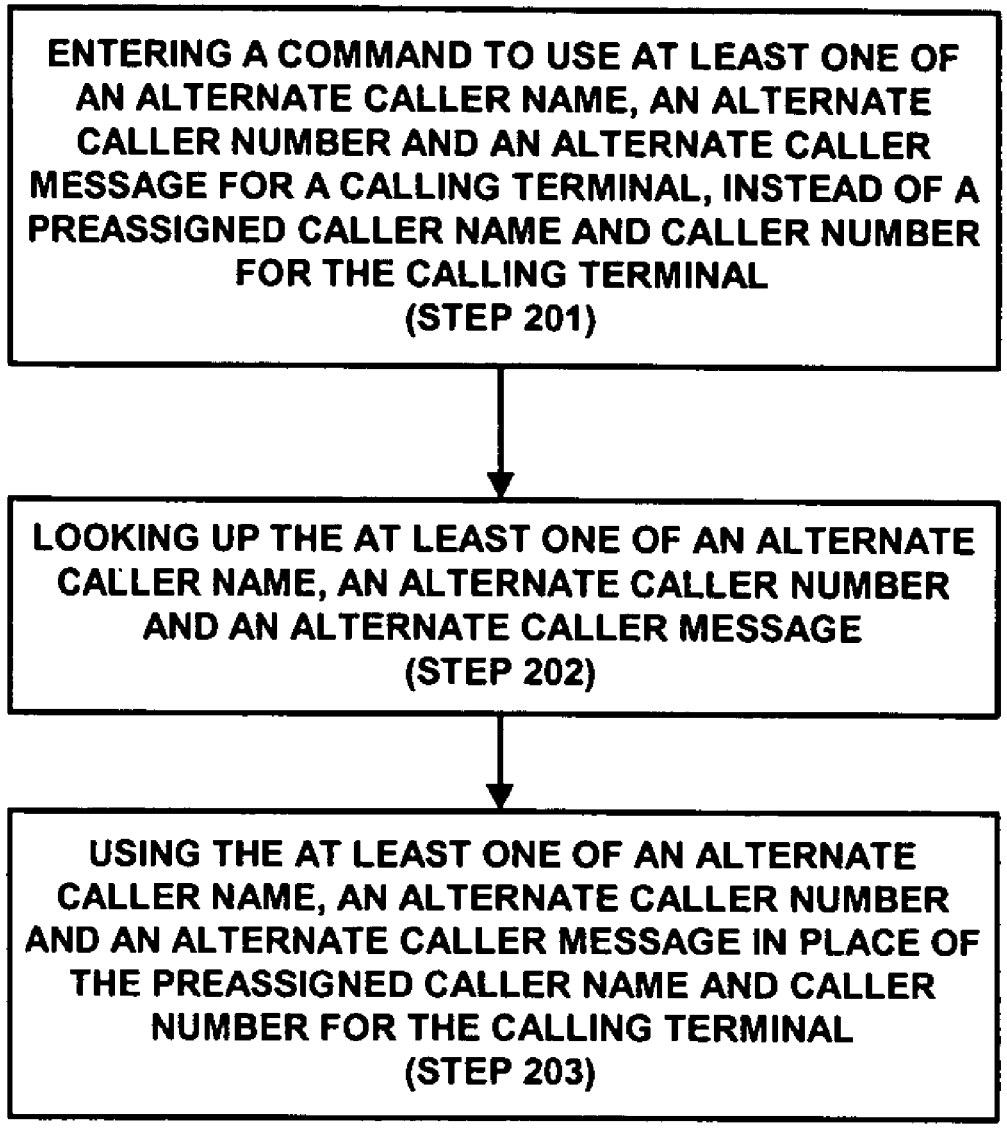
FIG. 2 illustrates a very general flow chart of logical operational steps that may be followed in accordance with one embodiment of the present method and system.

Referring to FIG. 2, one embodiment of a method for network support for providing caller flexibility on "name", "number", and "message" that is displayed in place of normal ANI and CNAP. This embodiment of the present method provides network support for caller flexibility information of a calling terminal. Such an embodiment may have the steps of: entering a command to use at least one of an alternate caller name, an alternate caller number and an alternate caller message for a calling terminal, instead of a preassigned caller name and caller number for the calling terminal (step 201); looking up the at least one of an alternate caller name, an alternate caller number and an alternate caller message (step 202); and using the at least one of an alternate caller name, an alternate caller number and an alternate caller message in place of the preassigned caller name and caller number for the calling terminal (step 203).

The calling terminal may be one of a mobile terminal and a non-mobile terminal. The command may be entered by the calling terminal or by the network.

Instead of only one alternate caller name, alternate caller number or alternate caller message there may be at least one of an array of alternate caller names, an array of alternate caller numbers and an array of alternate caller messages stored in a database in the network for the calling terminal. Also, the database in which is stored the at least one of an array of alternate caller names, an array of alternate caller numbers and an array of alternate caller messages may be a dynamic database, wherein the at least one of an array of alternate caller names, an array of alternate caller numbers and an array of alternate caller messages may be changeable by at least one of the calling terminal and the network.

In further embodiments of the present method and system the database may be programmed to, based on the time and day, provide a specific caller name and/or a specific caller number and/or a specific caller message. Besides the flexibility to alter the number/name/message on a per call basis, a fixed set of settings may be invoked based on a day and/or a time.

More specifically, one of the following may be used for the calling terminal: an alternate caller name; an alternate caller number; an alternate caller message; an alternate caller name and an alternate caller number; an alternate caller name and an alternate caller message; an alternate caller number and an alternate caller message; and an alternate caller name, an alternate caller number, and an alternate caller message. Other information may be used for the calling terminal in addition to that listed above.

Figure 3:
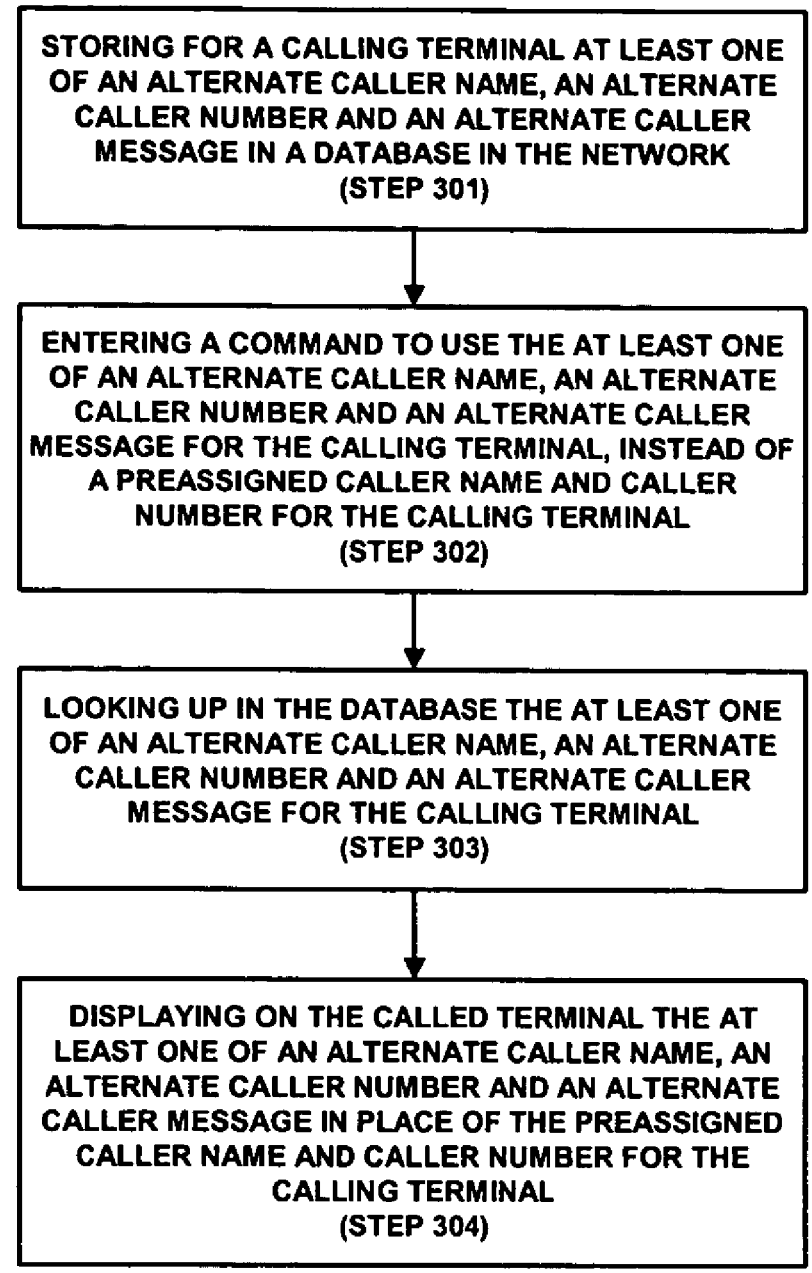
FIG. 3 illustrates a more specific flow chart of logical operational steps that may be followed in accordance with one embodiment of the present method and system.

Referring to FIG. 3, another embodiment of a method for network support for caller flexibility information of a calling terminal that is displayed on a called terminal, may have the steps of: storing for a calling terminal at least one of an alternate caller name, an alternate caller number and an alternate caller message in a database in the network (step 301); entering a command to use the at least one of an alternate caller name, an alternate caller number and an alternate caller message for the calling terminal, instead of a preassigned caller name and caller number for the calling terminal (step 302); looking up in the database the at least one of an alternate caller name, an alternate caller number and an alternate caller message for the calling terminal (step 303); and displaying on the called terminal the at least one of an alternate caller name, an alternate caller number and an alternate caller message in place of the preassigned caller name and caller number for the calling terminal (step 304). The calling terminal may be one of a mobile terminal and a non-mobile terminal, and the called terminal may be one of a mobile terminal and a non-mobile terminal.

Therefore, the improved present method and system overcomes the drawbacks of the prior art, such as, wherein the current ANI and CNAP functionality provides limited control to an end user/operator of what is displayed at the called party device. Embodiments of the present system and method provide caller flexibility on "name", "number", and "message" that is displayed in place of ANI and CNAP. In further embodiments of the present method and apparatus a subscriber may have the flexibility to create an array of numbers and an array of names or messages that may be displayed/ transmitted based on subscriber choice at any point in time. Thus, the displayed information may be dynamic and not just static.

Embodiments of the present method and system overcome the drawbacks of Page: 9 the prior art in that the prior art lacks the functionality in any of the current implementations (be it in the wireline or the wireless system) of the present method and system.

In further embodiments of the present method and system the database may be programmed to, based on the time and day, provide a specific caller name and/or a specific caller number and/or a specific caller message. Besides the flexibility to alter the number/name/message on a per call basis, a fixed set of settings may be invoked based on a day and/or a time.

The present system and method may be used with non-mobile phones and terminals, as well as, mobile phones and mobile terminals. Also, different types of data storage devices may be used with the present method and system. For example, a data storage device may be one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for network support for providing caller flexibility information of a calling terminal, comprising the steps of:
    entering a command to use at least one of an alternate caller name, an alternate caller number and an alternate caller message for a calling terminal, instead of a preassigned caller name and caller number for the calling terminal;
    looking up, based on at least one of a hour, minute, second and day, the at least one of an alternate caller name, an alternate caller number and an alternate caller message, the at least one of an alternate caller name, an alternate caller number and an alternate caller message being changeable by at least one of the calling terminal and a network; and
    using the at least one of an alternate caller name, an alternate caller number and an alternate caller message in place of the preassigned caller name and caller number for the calling terminal.

2. The method according to claim 1, wherein the calling terminal is one of a mobile terminal and a non-mobile terminal.

3. The method according to claim 1, wherein the command is entered by the calling terminal.

4. The method according to claim 1, wherein the calling terminal is in the network, and wherein the command is entered by the network.

5. The method according to claim 1, wherein the at least one of an alternate caller name, an alternate caller number and an alternate caller message is stored in a database in the network.

6. The method according to claim 5, wherein the database in which is stored the at least one of an alternate caller name, an alternate caller number and an alternate caller message is a dynamic database.

7. The method according to claim 1, wherein the at least one of an array of alternate caller names, an array of alternate caller numbers and an array of alternate caller messages is stored in a database in the network for the calling terminal.

8. The method according to claim 7, wherein the database in which is stored the at least one of an array of alternate caller names, an array of alternate caller numbers and an array of alternate caller messages is a dynamic database, and wherein the at least one of an array of alternate caller names, an array of alternate caller numbers and an array of alternate caller messages is changeable by at least one of the calling terminal and the network.

9. The method according to claim 1, wherein one of the following is used for the calling terminal: an alternate caller name; an alternate caller number; an alternate caller message; an alternate caller name and an alternate caller number; an alternate caller name and an alternate caller message; an alternate caller number and an alternate caller message; and an alternate caller name, an alternate caller number, and an alternate caller message.

10. A method for network support for providing caller flexibility information of a calling terminal that is displayed on a called terminal, comprising the steps of:
    storing for a calling terminal at least one of an alternate caller name, an alternate caller number and an alternate caller message in a database in the network;
    entering a command to use the at least one of an alternate caller name, an alternate caller number and an alternate caller message for the calling terminal, instead of a preassigned caller name and caller number for the calling terminal;
    looking up, based on at least one of a hour, minute, second and day, in the database the at least one of an alternate caller name, an alternate caller number and an alternate caller message, the at least one of an alternate caller name, an alternate caller number and an alternate caller message being changeable by at least one of the calling terminal and the network; and
    displaying on the called terminal the at least one of an alternate caller name, an alternate caller number and an alternate caller message in place of the preassigned caller name and caller number for the calling terminal.

11. The method according to claim 10, wherein the calling terminal is one of a mobile terminal and a non-mobile terminal, and wherein the called terminal is one of a mobile terminal and a non-mobile terminal.

12. The method according to claim 10, wherein the command is entered by the calling terminal.

13. The method according to claim 10, wherein the calling terminal and the called terminal are in the network, and wherein the command is entered by the network.

14. The method according to claim 10, wherein the database in which is stored the at least one of an alternate caller name, an alternate caller number and an alternate caller message is a dynamic database.

15. The method according to claim 10, wherein at least one of an array of alternate caller names, an array of alternate caller numbers and an array of alternate caller messages is stored in a database in the network for the calling terminal.

16. The method according to claim 15, wherein the database in which is stored the at least one of an array of alternate caller names, an array of alternate caller numbers and an array of alternate caller messages is a dynamic database, and wherein the at least one of an array of alternate caller names, an array of alternate caller numbers and an array of alternate caller messages is changeable by at least one of the calling terminal and the network.

17. The method according to claim 10, wherein one of the following is used for the calling terminal: an alternate caller name; an alternate caller number; an alternate caller message; an alternate caller name and an alternate caller number; an alternate caller name and an alternate caller message; an alternate caller number and an alternate caller message; and an alternate caller name, an alternate caller number, and an alternate caller message.

18. A system that provides caller flexibility on "name" and "number" of a calling terminal that is displayed on a called terminal, comprising the steps of:
- a calling terminal and a called terminal operatively connected to a network;
- a database operatively connected to the network;
- at least one of an alternate caller name, an alternate caller number and an alternate caller message, for the calling terminal, stored in the database;
- an input command, the input command effecting use of the at least one of an alternate caller name, an alternate caller number and an alternate caller message for the calling terminal, instead of a preassigned caller name and caller number for the calling terminal;
- wherein the input command is entered by at least one of the calling terminal and the network;
- wherein, when the input command is entered to use the at least one of an alternate caller name, an alternate caller number and an alternate caller message, the network displays, at the called terminal, the at least one of an alternate caller name, an alternate caller number and an alternate caller message for the calling terminal; and
- wherein the input command is overridden based on at least one of a time and day.

19. The system according to claim 18, wherein the calling terminal is one of a mobile terminal and a non-mobile terminal, and wherein the called terminal is one of a mobile terminal and a non-mobile terminal.

20. The system according to claim 18, wherein the command is entered by one of the calling terminal and the network.

21. The system according to claim 18, wherein the database is programmable, the database being programmed to, based on the time and day, provide a specific caller name and/or a specific caller number and/or a specific caller message, and wherein the database is programmed to invoke a fixed set of settings on at least one of a day and a time.

22. A method for network support for providing caller flexibility information of a calling terminal, comprising the steps of:
- entering a command to use a first calling line identification comprised of at least one of a first alternate caller name, a first alternate caller number and a first alternate caller message for a calling terminal, instead of a preassigned caller name and caller number for the calling terminal, wherein a first entity enters the command for display of the first calling line identification at a second entity;
- overriding the first calling line identification with a second calling line identification that is entered by a third entity wherein the second calling line identification comprises at least one of a second alternate caller name, a second alternate caller number and a second alternate caller message; and
- using the second calling line identification in place of the first calling line identification for display at the calling terminal.

23. The method of claim 22, wherein the command is overridden based on at least one of a time and day.

* * * * *